US011219971B2

United States Patent
Lateana et al.

(10) Patent No.: US 11,219,971 B2
(45) Date of Patent: Jan. 11, 2022

(54) METHOD FOR JOINING AN ELEMENT OF METAL MATERIAL TO AN ELEMENT OF PLASTIC MATERIAL, AND A HYBRID COMPONENT OBTAINED BY THIS METHOD

(71) Applicant: C.R.F. Società Consortile per Azioni, Orbassano (IT)

(72) Inventors: Adriano Lateana, Orbassano (IT); Piergiorgio Romanin, Orbassano (IT)

(73) Assignee: C.R.F. Società Consortile per Azioni

( * ) Notice: Subject to any disclaimer, the term of this patent is extended or adjusted under 35 U.S.C. 154(b) by 175 days.

(21) Appl. No.: 16/382,279

(22) Filed: Apr. 12, 2019

(65) Prior Publication Data

US 2019/0314933 A1 Oct. 17, 2019

(30) Foreign Application Priority Data

Apr. 17, 2018 (EP) ..................................... 18167771

(51) Int. Cl.
*B23K 26/20* (2014.01)
*B23K 26/32* (2014.01)
(Continued)

(52) U.S. Cl.
CPC ...... *B23K 26/354* (2015.10); *B23K 2101/006* (2018.08); *B23K 2103/04* (2018.08); *B23K 2103/10* (2018.08); *B23K 2103/42* (2018.08)

(58) Field of Classification Search
CPC .... B23K 26/20–302; B23K 26/32–324; B29C 65/16
See application file for complete search history.

(56) References Cited

U.S. PATENT DOCUMENTS

| 2002/0031648 A1* | 3/2002 | Ohashi | B32B 27/28 |
| | | | 428/196 |
| 2004/0045943 A1* | 3/2004 | Yabu | A63B 53/04 |
| | | | 219/121.64 |

(Continued)

FOREIGN PATENT DOCUMENTS

DE 102005035495 A1 2/2007
GB 2550966 A 12/2017
(Continued)

OTHER PUBLICATIONS

English translation of JP 2010247206 to Kutsuna (Year: 2010).*
(Continued)

*Primary Examiner* — Michael A LaFlame, Jr.
(74) *Attorney, Agent, or Firm* — RMCK Law Group PLC

(57) ABSTRACT

A method for joining a metal material element to a plastic material element, in particular a composite material including a plastic matrix reinforced with fibers for use in the construction of motor-vehicle components. The method involves providing one or more slots in a portion of the plastic material element. For each slot, a corresponding tab is provided in the metal material element, having a shorter width and length than a width and length of the slot. The metal material and plastic material elements are arranged in a position of mutual coupling where each tab is inserted through the corresponding slot and has an end portion protruding beyond said portion of the plastic material element. A laser beam is directed above the protruding end portion, so as to locally melt the metal material of each tab and create an enlarged head on each tab that is welded above the plastic material element.

7 Claims, 3 Drawing Sheets

(51) Int. Cl.
    *B29C 65/16*     (2006.01)
    *B23K 26/354*     (2014.01)
    *B23K 103/10*     (2006.01)
    *B23K 103/00*     (2006.01)
    *B23K 103/04*     (2006.01)
    *B23K 101/00*     (2006.01)

(56) References Cited

U.S. PATENT DOCUMENTS

| | | | |
|---|---|---|---|
| 2010/0222799 A1* | 9/2010 | Roeper | A61B 5/150328 |
| | | | 606/181 |
| 2016/0311153 A1* | 10/2016 | Mayer | B29C 66/712 |
| 2017/0165786 A1* | 6/2017 | Stol | B23K 26/244 |
| 2018/0369971 A1* | 12/2018 | Chiang | F28F 13/187 |
| 2019/0368524 A1* | 12/2019 | Fujiwara | B23K 9/232 |
| 2020/0298340 A1* | 9/2020 | Fujiwara | F16B 5/08 |

FOREIGN PATENT DOCUMENTS

| | | |
|---|---|---|
| JP | 2010247206 A | 11/2010 |
| JP | 2013237052 A | 11/2013 |

OTHER PUBLICATIONS

English translation of JP 2013237052 to Shigeki Saito (Year: 2013).*
European Search Report dated Oct. 30, 2018. 3 pages.

* cited by examiner

METHOD FOR JOINING AN ELEMENT OF METAL MATERIAL TO AN ELEMENT OF PLASTIC MATERIAL, AND A HYBRID COMPONENT OBTAINED BY THIS METHOD

CROSS-REFERENCE TO RELATED APPLICATION

This application claims priority to European Patent Application No. 18 167 771.7 filed Apr. 17, 2018. The disclosure of the above application is incorporated herein by reference in its entirety.

FIELD OF THE INVENTION

The present invention relates to a method for joining an element of metal material to an element of plastic material, in particular plastic material reinforced with fibers. The invention relates in particular to methods of this type used to produce hybrid components for use in the construction of motor-vehicles.

PRIOR ART

In recent years, the automotive field has seen an increasing development in the use of hybrid components, consisting of elements of metal material and elements of plastic material connected to each other. One reason for this development is the need to reduce the weight of vehicle structures, primarily in order to reduce fuel consumption. In particular, it has been previously proposed to couple elements of metal material (for example, of steel or aluminum) with elements of composite material, including a plastic matrix reinforced with fibers, such as glass fibers, carbon fibers or polyammide fibers (kevlar). This use has also extended to the structural components of the motor-vehicle, which must be configured to safely and reliably support the stresses to which they are subjected. However, all the solutions that have been proposed up to now to produce a joint between an element of metal material and an element of plastic material forming part of a structural component of a motor-vehicle are not totally satisfactory, either because they do not guarantee a safe joint, or because they involve a risk of damage to the element of plastic material as a result of the joining operation, or because they involve relatively troublesome and complicated operations, with a consequent increase in production times and costs.

OBJECT OF THE INVENTION

The object of the present invention is to overcome the drawbacks of the known solutions, by providing a joining method that is simple and enables a joint to be obtained which is capable of reliably withstanding very high forces and which does not entail any appreciable increase in production times and costs.

SUMMARY OF THE INVENTION

In view of achieving this object, the invention relates to a method for joining an element of metal material to an element of plastic material, in particular plastic material reinforced with fibers, including the steps of:
providing one or more slots in a portion of the element of plastic material,
for each slot of the element of plastic material, providing a corresponding tab in the first component of metal material, said tab having a cross-section with shorter width and length than the width and length of the slot,
positioning the element of metal material and the element of plastic material in a position of mutual coupling wherein each tab of the element of metal material is inserted through a corresponding slot of the element of plastic material, and has an end portion protruding beyond said portion of the first component of metal material,
directing a laser beam above the end portion of each tab that protrudes beyond said portion of the element of plastic material, so as to locally melt the metal material of each tab and create an enlarged head on each tab that is melted above said element of plastic material, so as to rigidly connect the element of metal material and the element of plastic material to each other.

Thanks to the characteristics indicated above, the method according to the invention allows the joint between the element of metal material and the element of plastic material to be created without any risk of damage to the plastic material. The welding operation is carried out by locally directing a laser beam above the end portion of each tab of the element of metal material that protrudes beyond the slot in the element of plastic material. In this way, the plastic material does not substantially undergo any thermal stresses.

The method according to the invention can be used to create structural components consisting of one or more elements of metal material and of one or more elements of plastic material defining an open section or a closed section.

In one embodiment, the portion of the element of plastic material in which each slot is formed is substantially flat and each of the tabs formed in the component of metal material protrudes from an edge of said component which, in the coupling position of the two elements, abuts against a first surface of the aforesaid substantially flat portion of the component of plastic material.

In an exemplary embodiment, each slot formed in the element of plastic material has a substantially straight and elongated configuration, the corresponding tab having a cross-section with a corresponding configuration. However, one or more of the slots formed in the element of plastic material could have a different configuration, for example, an angled configuration, with two inclined sections, for example perpendicular to each other, and the element of metal material could have a tab with a cross-section having a corresponding shape, or having two separate tabs designed to engage the two different sections of the same angled slot. Of course, this variant is mentioned herein by way of example only, being evident that there could be any configuration of the slots formed in the element of plastic material and the corresponding configuration of the tabs formed in the element of metal material.

As already indicated, the method according to the invention can also be used to form structural components including one or more elements of plastic material and one or more elements of metal material, the described method being able to be adopted whenever a joint needs to be created between a metal element and a plastic element.

BRIEF DESCRIPTION OF THE DRAWINGS

Further characteristics and advantages of the invention will become apparent from the description that follows with reference to the attached drawings, provided purely by way of non-limiting example, wherein.

DETAILED DESCRIPTION OF PREFERRED EMBODIMENTS

Figure 1:
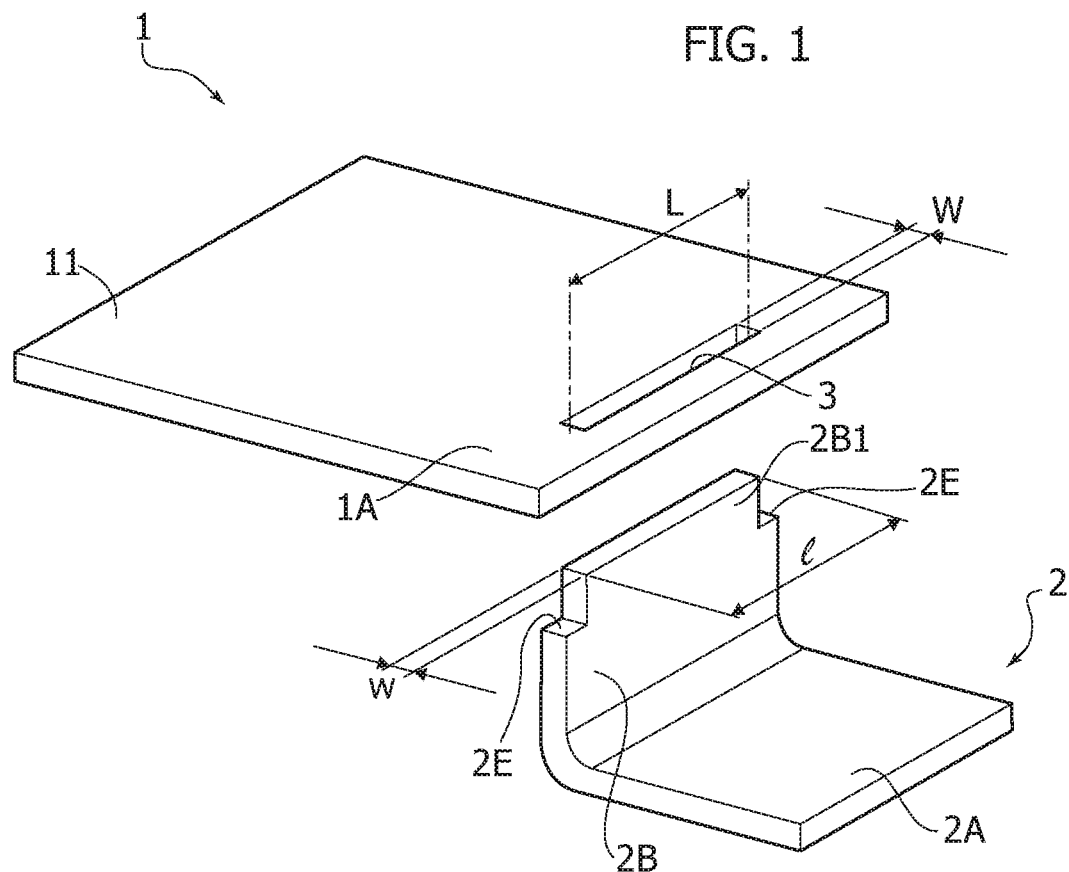
FIGS. 1, 2 and 3 are schematic perspective views that illustrate three successive steps of the method according to the invention in a first embodiment.

With reference to FIG. 1, numeral 1 indicates—in its entirety—an element in the form of a flat panel, made of plastic material, in particular composite material, including a synthetic resin reinforced with fibers, for example glass fibers, carbon fibers or polyamide fibers. The reference number 2 indicates—in its entirety—an element of metal material, for example, of steel or aluminum, which in the illustrated case is in the form of an angular element with a main portion 2A and a portion 2B constituting a substantially perpendicular tab with respect to the portion 2A and ending with an end portion 2B1, having a width "l" less than the width of the portions 2A, 2B.

Of course the specific configuration of the elements 1, 2 illustrated in FIG. 1 is provided purely by way of non-limiting example. It is evident that there can be any configuration of each of these elements.

In the illustrated example, the element of plastic material 1 includes at least one substantially flat portion 1A. In this portion 1A, a through-slot 3 is formed. FIG. 1 illustrates, by way of example, the case in which a single slot 3 is formed in the element 1, this slot having a straight configuration and presenting a length L and a width W. Again in the case of the illustrated example, the slot 3 is made adjacent to one side of the panel 1, parallel to this panel.

The dimensions L, W of the slot 3 are chosen so as to be slightly longer than the length l and the width w of the end cross-section of the tab 2B.

Figure 2:
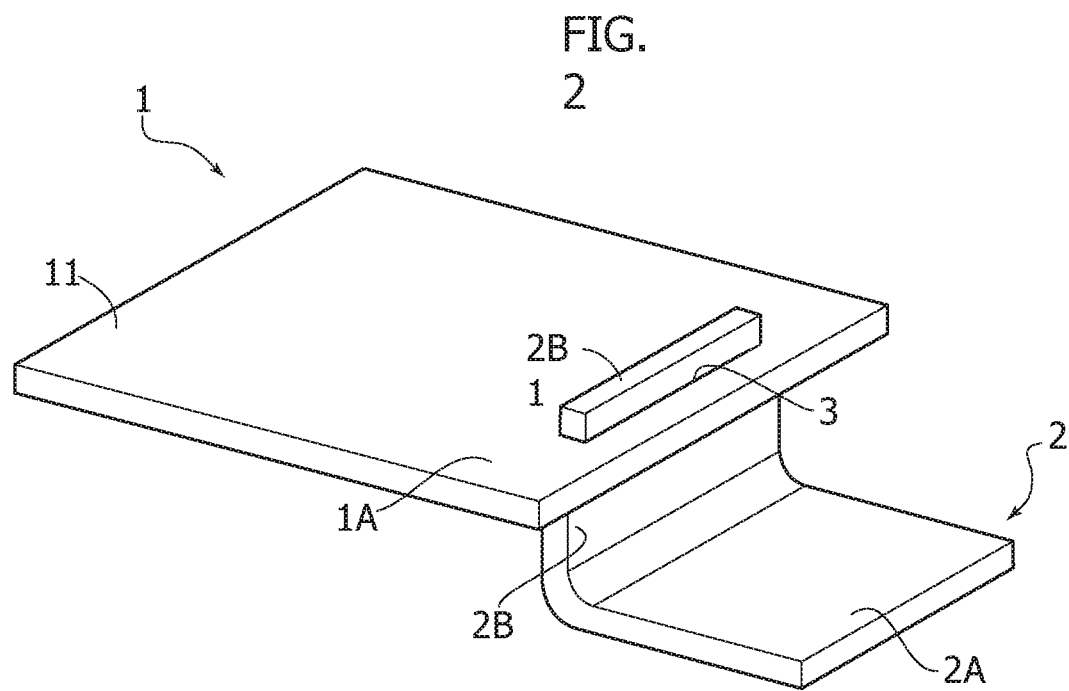

In the example illustrated in the method according to the invention, the elements 1, 2 to be joined are brought into a coupling position, illustrated in FIG. 2, in which the tab 2B is inserted through the slot 3 and has its end portion 2B1 that protrudes above the upper surface 11 (with reference to the figures) of the panel 1.

Once the elements 1, 2 have been brought into the coupling condition illustrated in FIG. 2, a laser welding operation is performed, using a laser torch T (FIG. 3) of any known type, for example a laser head for proximity welding (i.e., where the laser head is relatively close to the workpiece) or a laser head for remote welding (i.e., where the laser torch is relatively spaced apart relative to the workpiece), or a "wobbling" laser head (i.e. an oscillating laser beam). The laser torch is controlled and moved so as to direct a laser beam F progressively over the entire extension of the end portion 2B1 of the tab 2B that protrudes beyond the panel 1. In this way, the metal material of the end portion 2B1 is melted and produces an enlarged head 2B2 which engages against the surface 11 of the panel 1, adhering thereto.

Once the operation has been carried out, a downward movement (with reference to the figures) of the tab 2B with respect to the panel 1 is prevented by the engagement of the head 2B2 against the upper surface 11 of the element of plastic material. An upward movement is instead prevented by the contact between the shoulders 2E defined on the two sides of the end portion 2B1 against the lower surface of the panel 1

Thanks to the method described above, a hybrid component is thus obtained comprising the element of composite material 1 and the metal element 2 rigidly coupled to each other. The entire cross-section of the portion of metal material contained within the slot 3 constitutes the section resistant to a force tending to decouple the two elements 1, 2 from each other.

Figure 3:
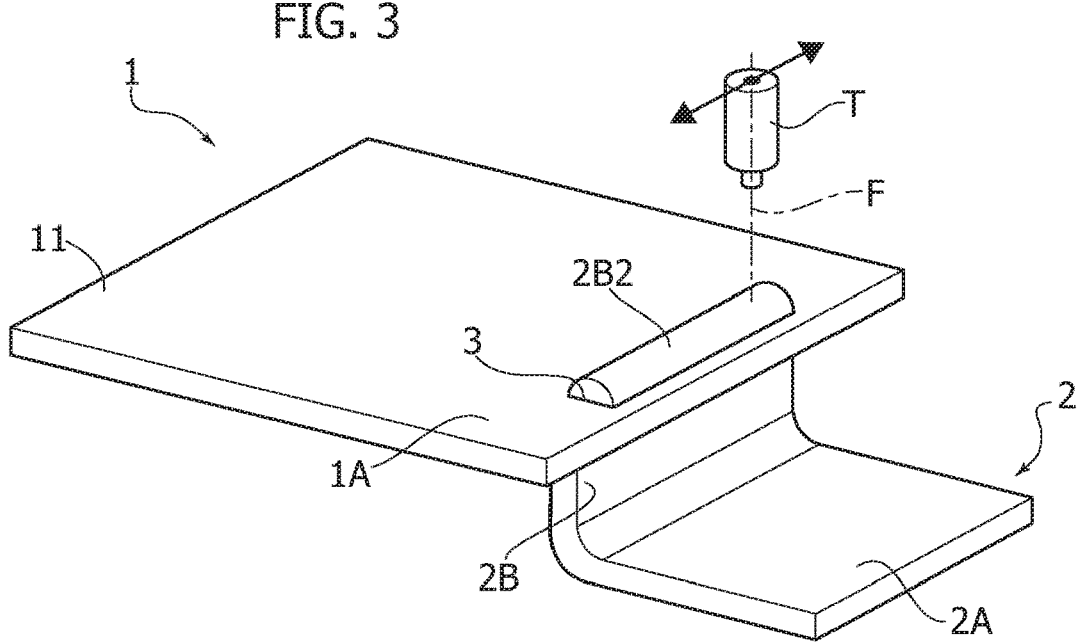
Figure 4:
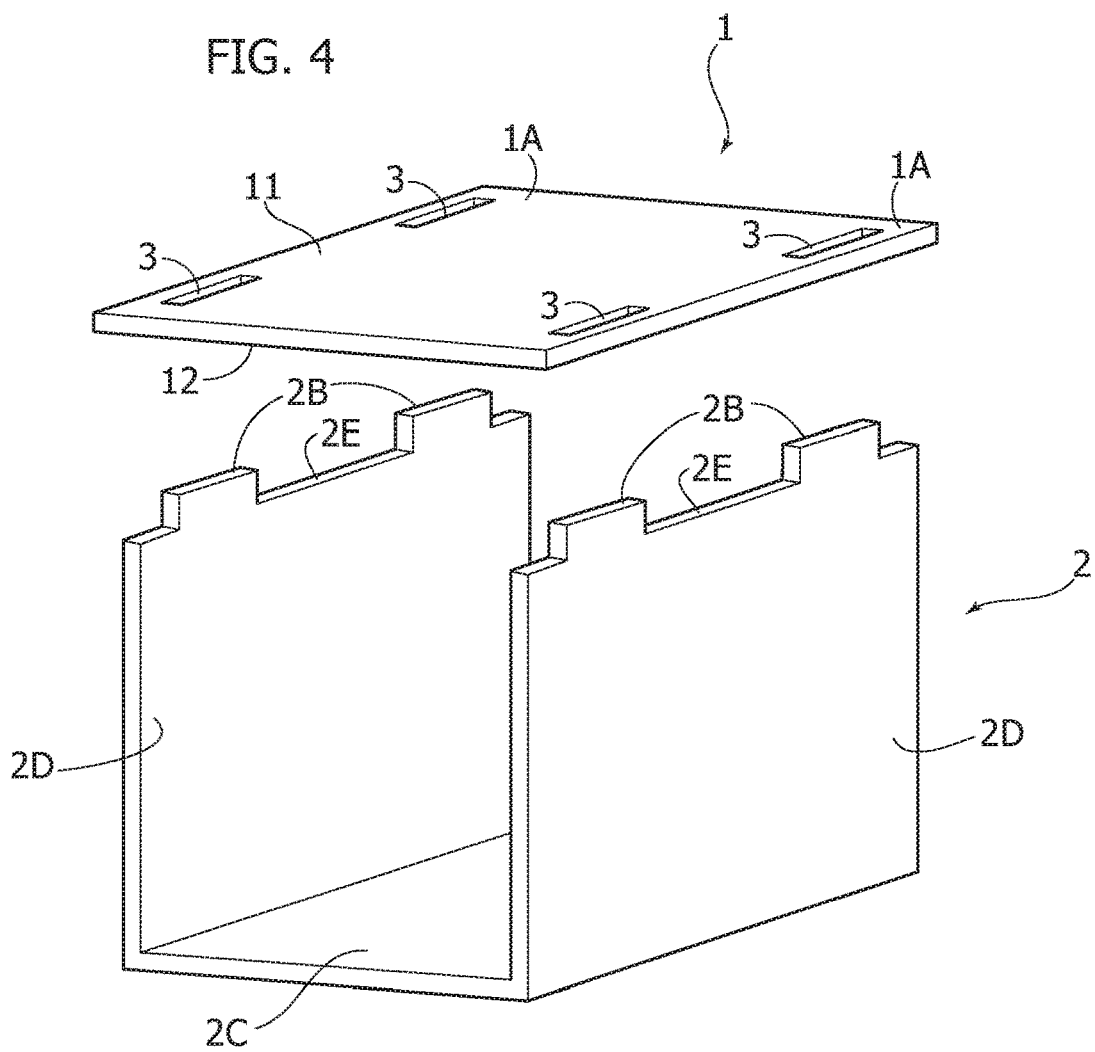
FIGS. 4, 5 and 6 are schematic perspective views showing the same steps illustrated in FIGS. 1-3 in the case of a second embodiment example.
Figure 5:
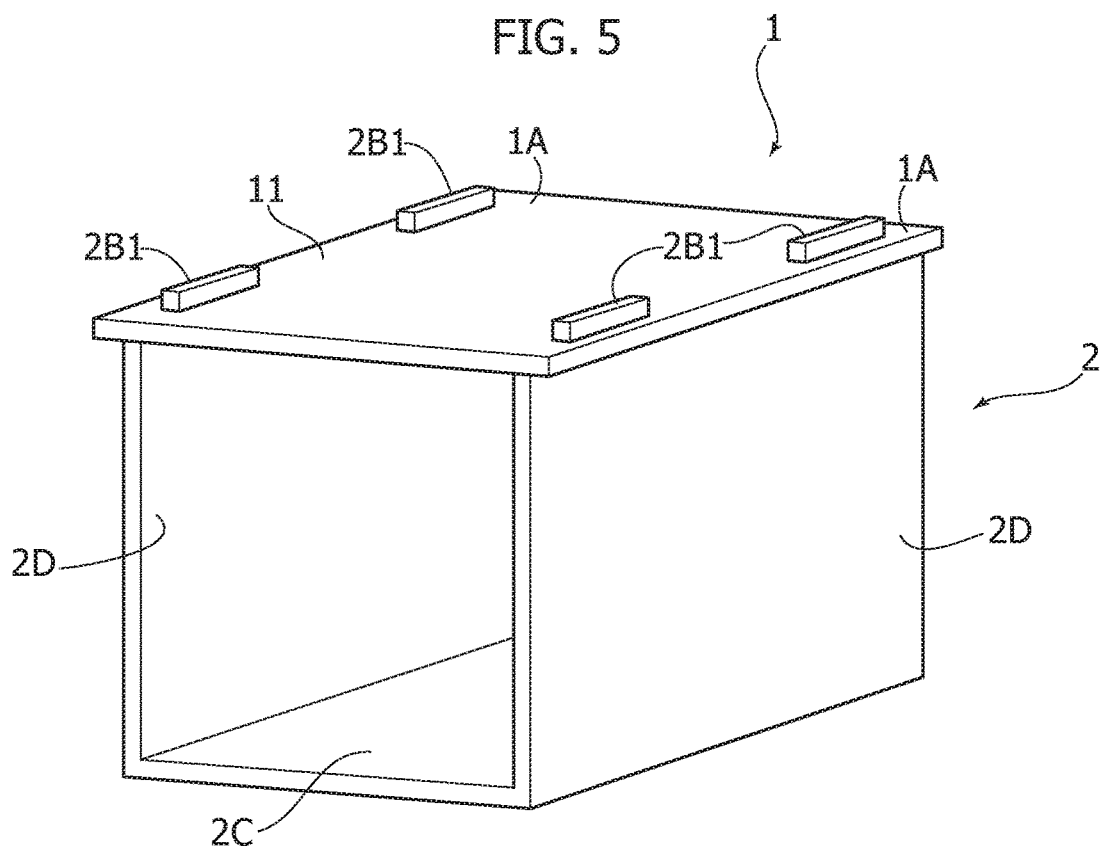
Figure 6:
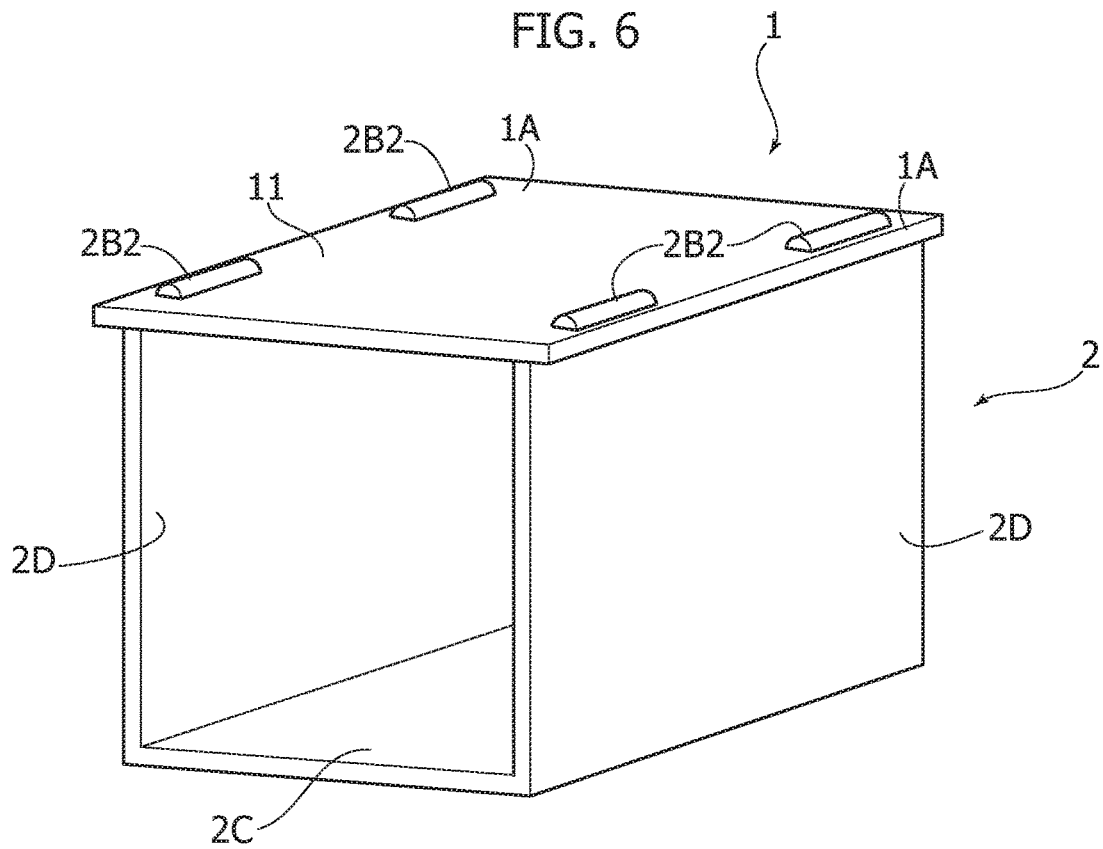

FIGS. 4, 5 and 6 show the same steps of the method according to the invention applied to an embodiment example in which the element of metal material 2 has a C-shaped conformation, with a central wall 2C, two side walls 2D parallel to each other that extend from the central wall 2C. Each of the side walls 2D (see FIG. 4) has an end edge 2E from which two tabs 2A protrude and, in the coupling condition of the two elements 1, 2, illustrated in FIG. 5, each tab 2A is received through a corresponding slot 3 of the panel of composite material 1. In the coupling condition, the edge 2E of each lateral wall 2D comes into contact with the surface 12 of the panel 1 which, in the attached figures, is facing downwards. Also in this case, in the coupling condition shown in FIG. 5, each tab 3 has an end portion 2A1 protruding beyond the surface 11 of the panel 1, which is then irradiated with the laser beam (similarly to what is shown in FIG. 3) so as to melt and be welded above the upper surface 11 of the panel 1, forming an enlarged head 2A2. In the component thus obtained, the panel 1 defines a fourth side of the closed cross-section of the component.

The method according to the invention has the advantage of being simple, of not causing any significant increase in production times and costs and of allowing a joint to be obtained that is able to reliably withstand very high decoupling forces.

As has been shown, the method can be used to produce hybrid components with an open or closed section, each formed by one or more elements of plastic material and by one or more elements of metal material. While the junctions between elements of plastic material and the junctions between elements of metal material can be made with any conventional art, each joint between an element of plastic material and an element of metal material is formed by the method described herein.

Of course, without prejudice to the principle of the invention, the details of construction and the embodiments may vary widely with respect to those described and illustrated purely by way of example, without departing from the scope of the present invention, as defined by the attached claims.

What is claimed is:

1. A method for joining a portion of an element of metal material to a portion of an element of plastic material, with said portions lying in planes orthogonal to each other, the method comprising:
   providing one or more slots in the portion of said element of plastic material,
   for each slot of the one or more slots, providing a corresponding tab in the portion of the element of metal material, said tab having a cross-section with shorter width and a shorter length than a width and a length of each slot,
   arranging the element of metal material and the element of plastic material in a position of mutual coupling in planes orthogonal to one another, wherein each tab of the element of metal material is inserted through a corresponding slot in the element of plastic material and has an end portion protruding beyond said portion of the element of plastic material, performing laser welding by directing a laser beam above the end portion of each tab protruding beyond said portion of the element of plastic material, so as to locally melt the metal material of each tab and create an enlarged head on each tab, which is welded above said element of plastic material, so as to rigidly connect the element of metal material and the element of plastic material to each other.

2. The method according to claim 1, wherein:

the portion of the element of plastic material in which each slot is formed is substantially flat, each of said tabs provided on the element of metal material protrudes from an edge of the element of metal material, in said position of mutual coupling, before performing the laser welding, said edge of the element of metal material abuts against a first surface of said substantially flat portion of the element of plastic material.

3. The method according to claim 1, wherein the element of metal material and the element of plastic material are arranged and configured in such a way so that in a coupled condition they define a component with a closed cross-section.

4. The method according to claim 1, wherein the element of metal material and the element of plastic material are arranged and configured in such a way so that in a coupled condition they define a component with an open cross-section.

5. The method according to claim 1, wherein the one or more slots formed in the element of plastic material have an angled configuration, with two inclined sides, and the element of metal material has the tab with a corresponding shaped cross-section, or two separate tabs designed to engage two different sides of the same angled slot.

6. The method according to claim 3, wherein:

the element of metal material has a C-shaped configuration, with a central wall and two parallel side walls, extending from the central wall, each of the side walls has an end edge from which more tabs protrude, and in the coupling condition of the elements of metal material and of plastic material, each tab is received through a corresponding slot of the element of plastic material, and there is a panel in the element of plastic material that defines a fourth side of a closed cross-section of the component.

7. A structural component of a motor-vehicle, comprising at least one element of plastic material and at least one element of metal material connected by a joint obtained with the method according to claim 1.

\* \* \* \* \*